April 20, 1926.

W. A. WALSH

MOUNTING OF PULLEYS EMPLOYED IN THE TAPE DRIVING OF
SPINDLES IN RING SPINNING AND DOUBLING FRAMES

Filed Dec. 16, 1925

1,581,991

Inventor
William Arthur Walsh
per: A. Gadd
ATTORNEY:-

Patented Apr. 20, 1926.

1,581,991

UNITED STATES PATENT OFFICE.

WILLIAM ARTHUR WALSH, OF ACCRINGTON, ENGLAND, ASSIGNOR TO H. & B. AMERICAN MACHINE COMPANY, OF PAWTUCKET, RHODE ISLAND.

MOUNTING OF PULLEYS EMPLOYED IN THE TAPE DRIVING OF SPINDLES IN RING SPINNING AND DOUBLING FRAMES.

Application filed December 16, 1925. Serial No. 75,802.

*To all whom it may concern:*

Be it known that I, WILLIAM ARTHUR WALSH, a subject of the King of Great Britain, residing at Accrington, Lancashire, England, have invented certain new and useful improvements in and relating to the mounting of pulleys employed in the tape driving of spindles in ring spinning and doubling frames, of which the following is a specification.

The invention relates to the pulleys employed in the tape driving of spindles in ring spinning and doubling frames, and in which frames it is requisite to provide means whereby spindles may be driven "weft way" or, alternatively, "twist way" at will, as is understood, or vice versa.

The object of the invention is to provide a series of mounts or supports in pairs, or one pair for each pulley-carrier, and so that the transference of each pulley-carrier from one support to another of a pair, will at once result in change of angular position of the pulleys concerned, suitable for changing from the condition of driving the spindles "weft way" to driving them "twist way" or vice versa, without further adjustment of such pulley-carriers, the tapes guided by said pulleys having been manipulated suitably for the purpose.

According to my invention I mount or provide the pairs of supports upon a fixed shaft (which shaft lies parallel or thereabouts to the axis of the tin roller driving the spindles), and in such manner that a suitable or desirable angle or elevation of said supports is attained.

In one form of support each is formed with projecting jaw-cavities or bearings beyond the axis of the shaft or mount referred to, the lower end of one cavity or bearing being slightly nearer (according to the required conditions) the axis of said shaft than the lower end of the other cavity or bearing for the same support, the cavities or bearing named being on opposite sides of the support. This means, for the purpose of conforming to the conditions whereby change from weft-way to twist-way driving of the spindles may be attained, or vice-versa, the position of the axis or pivot of the pulley-carrier relatively to the axis of the shaft or mount, is different, both as regards component horizontal and vertical planes, for the two sides of the support, as will be clear from the accompanying drawings.

With reference to said drawings Fig. 1 is a side elevation of a portion of a pulley-carrier, provided with a pulley and mounted within a support according to a form of my invention. Said Fig. 1 is on a reduced scale relatively to the remaining figures of the drawings.

Figure 1:
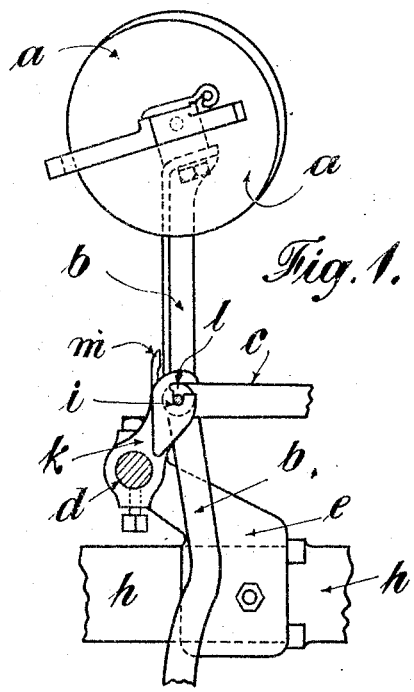
Figure 3:
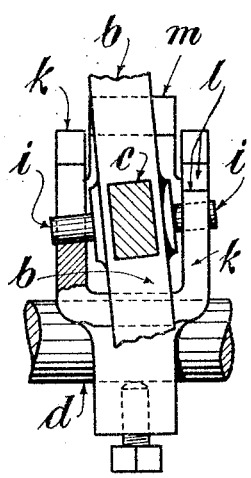
Fig. 3 is a view at right angles to Fig. 2 and with a part of a pulley-carrier included. Certain parts of the latter and of the support are sectioned.

Fig. 3 aforesaid indicates a support arranged to be suitable for the pulley-carrier mounted therein when the spindles are being driven "weft way", the view shown being assumed to face said spindles. That is to say, in Fig. 1 spindles are assumed to be to the right of the carrier-indicated, and the tin roller to the left.

Figure 4:
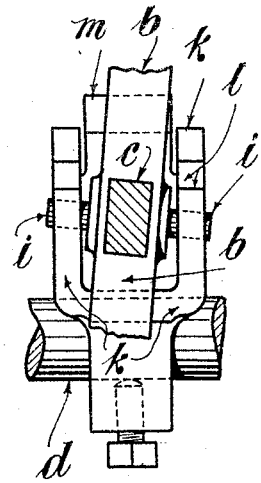

Fig. 4 is a similar view to Fig. 3 excepting that the conditions are suitable for the spindles being driven "twist way". The supports in Figs. 3 and 4 thus form a pair situated at a suitable distance apart on the shaft shown, the pulley-carrier being capable of being moved from the one to the other so as to take up the positions illustrated, but alternatively as desired.

Figure 5:
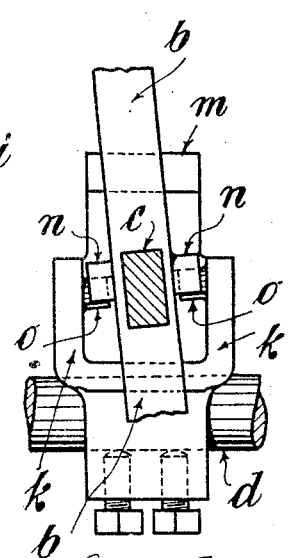

Fig. 5 shows a modification of the invention relatively to Fig. 3, but the alteration necessary for it to form a modification of Fig. 4 is obvious.

*a* is a pulley for guiding its tape from the tin roller to the spindles, or may be pairs of spindles on each side of the tin roller in the case of a double frame.

*b* is the pulley-carrier, the lower end of which is formed with a counterbalance weight (not shown). An extension or bar *c* from *b* may be employed and suitably weighted when employed in twisting frames, or may be ring spinning frames.

*d* is a shaft parallel to the axis of the tin roller, not indicated, and here mounted fixedly upon a bracket *e* attached to a part *h* of the framing of the machine.

In Figs. 1 to 4 inclusive, the pulley-carrier *b* is provided with projecting pins *i* whereby the carrier may be pivoted within the support k formed with jaws l for the purpose. The supports illustrated are shown capable of attachment to shaft d by means of set-screws.

Figure 2:
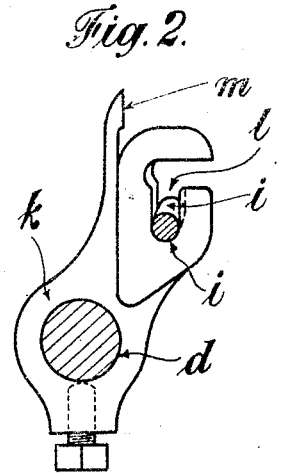
Fig. 2 shows a side view also of the support in Fig. 1 with details added to make the invention clear.

In Fig. 2 a pin i on one side of the support is shown in section, and a similar pin on the opposite side of the support is merely indicated by means of a circle for clearness. As already described, the direct distance between the centre of the sectioned pin and the centre of shaft d in Fig. 2 is different to the direct distance between the centre of the pin end shewn plain and said shaft axis; so that the plain pin end is not only farther to the right (or more advanced) than the sectioned pin end, but is also at a different elevation, the two directions being components of a direct distance above referred to.

In this way, on account of the cavities or jaws of the support being arranged to bring about the above result, the pulley a is given the requisite tilts in the horizontal and vertical planes.

In the figures shown, the supports k are formed with upper extensions, terminating in each case with a face or surface m whereby the possible movement of the pulley-carrier b or pulley a towards the tin roller may be limited.

In Fig. 5 the pulley-carrier b is formed with side bearings or yokes n capable of resting upon angled side pins o projecting from the support k. In this example jaws are not necessary, and it is obvious that the yokes n may be extended downwards to a greater length than shown. It will be seen that between the side parts or jaws in the various figures, there is space allowed to take the pulley-carrier b in each instance, that is to say, the surface of the support behind said carrier may be approximately in the same vertical plane as the surface m in Fig. 2 or otherwise.

It will thus be seen that by providing a pair of brackets for one pulley-carrier, mounted upon a shaft or equivalent, each bracket formed with angular parts so that the engagement of the pulley-carrier therewith, results in the necessary tilting of the latter, the tilting for the one bracket of a pair being suitable for "weft way" driving of the spindles, and the tilting for the other bracket of a pair being suitable for "twist way" driving of said spindles, said pulley-carrier only requires to be bodily moved from one bracket of a pair to the other of said pair to bring about the change of angular position referred to.

Of the supports forming a pair in Figs. 3 and 4, the one is herein referred to as of "opposite hand" to the other.

I claim:—

1. For the mounting of pulleys employed in the tape driving of spindles in ring spinning and doubling frames, a weighted pulley-carrier freely supported at each side upon inclined mounts forming part of said support, one of said mounts situated in advance of the other, and said support adapted for fixation parallel or thereabouts to the axis of the tin roller of the frame, adjacent to a like provided support of opposite hand, for the purpose and substantially as herein set forth.

2. For the mounting of pulleys employed in the tape driving of spindles in ring spinning and doubling frames, a weighted pulley-carrier freely supported at each side by projecting parts, inclined jaws forming part of a bracket constituting said support and for receiving said projecting parts, one of said jaws situated in advance of the other, and said bracket adapted for fixation parallel or thereabouts to the axis of the tin roller of the frame, adjacent to a like provided bracket of opposite hand, for the purpose and substantially as herein set forth.

3. For the mounting of pulleys employed in the tape driving of spindles in ring spinning and doubling frames, a weighted pulley-carrier freely supported at each side by projecting yokes, inclined pins forming part of a bracket constituting said support and for receiving said projecting yokes, one of said inclined pins situated in advance of the other, and said bracket adapted for fixation parallel or thereabouts to the axis of the tin roller of the frame, adjacent to a like provided bracket of opposite hand, for the purpose and substantially as herein set forth.

In testimony whereof I have affixed my signature.

WILLIAM ARTHUR WALSH.